(12) United States Patent
Stevenson et al.

(10) Patent No.: US 7,018,709 B2
(45) Date of Patent: Mar. 28, 2006

(54) CONTAMINATION-RESISTANT COATED SUBSTRATES

(75) Inventors: Janice P. Stevenson, Blacksburg, VA (US); Martin E. Rogers, Blacksburg, VA (US); Daniela M. Topasna, Lexington, VA (US)

(73) Assignee: Luna Innovations Incorporated, Blacksburg, VA (US)

( * ) Notice: Subject to any disclaimer, the term of this patent is extended or adjusted under 35 U.S.C. 154(b) by 175 days.

(21) Appl. No.: 10/690,070

(22) Filed: Oct. 21, 2003

(65) Prior Publication Data

US 2004/0191504 A1    Sep. 30, 2004

Related U.S. Application Data

(60) Provisional application No. 60/420,254, filed on Oct. 22, 2002.

(51) Int. Cl.
*B32B 1/00* (2006.01)
(52) U.S. Cl. ............... 428/332; 428/336; 428/412; 428/421; 428/426
(58) Field of Classification Search ............ 428/332, 428/421
See application file for complete search history.

(56) References Cited

U.S. PATENT DOCUMENTS

| 4,500,694 A | 2/1985 | Ohmori et al. |
| 5,006,624 A | 4/1991 | Schmidt et al. |
| 5,470,908 A | 11/1995 | Schmidt et al. |
| 6,270,946 B1 | 8/2001 | Miller |
| 6,451,871 B1 * | 9/2002 | Winterton et al. .......... 523/106 |

OTHER PUBLICATIONS

Jun Lin, et al., "Cross-Linking and Physical Characteristics of a Water-Based Nonstick Hydrophobic Coating," Langmuir, Dec. 1, 1996, 6676-6680, vol. 12, American Chemical Soc.

Andreas F. Thunemann, Kai Helmut Lochhaas, "Surface and Solid-State Properties of a Fluorinated Polyelectrolyte-Surfactant Complex," Langmuir, Apr. 7, 1999, 4867-4874, vol. 15.

Donald L. Schmidt, et al., "Water-based non-stick hydrophobic coatings," Nature, Mar. 3, 1994, 39-41, vol. 368.

Junyan Chen, et al., "Fluorescence Studies on Hydrophobic Associations of Fluorocarbon-Modified Poly(acrylic acid) Solutions," Macromolecules, May 12, 1999, 4861-4866, vol. 32.

* cited by examiner

*Primary Examiner*—Monique R. Jackson
(74) *Attorney, Agent, or Firm*—Joy L. Bryant

(57) ABSTRACT

A coated substrate is claimed. The coating, disposed on the substrate, comprises a self-assembled film having at least one bilayer. Each bilayer comprises a polyanion electrolyte layer and a polycation electrolyte layer. The uppermost layer or exposed layer of the coating comprises a fluoroalkyl group. Each bilayer thickness ranges from about 0.1 nanometers to about 20 nanometers. The resulting coated substrate has a low surface energy and is hydrophobic and/or oleophobic.

42 Claims, 1 Drawing Sheet

CONTAMINATION-RESISTANT COATED SUBSTRATES

CROSS-REFERENCE TO RELATED APPLICATIONS

This application claims the benefit of U.S. Provisional Patent Application Ser. No. 60/420,254 entitled, "Contamination-Resistant Coated Substrates," filed Oct. 22, 2002, and is hereby incorporated by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F29601-02-C-0145 awarded by Air Force Research Lab, Kirtland Air Force Base.

FIELD OF THE INVENTION

The present invention relates to coatings. In particular, it relates to a substrate that is coated with a self-assembled film coating that is resistant to contamination.

BACKGROUND OF THE INVENTION

The demand exists for coatings that are resistant to contamination. In particular, in the field of optics, these coatings not only need to resist contamination but also must be very thin with very low absorption such that the optical properties of the substrate, to which the coatings are applied, are not adversely affected. Typical optical coatings are prepared from various polymeric materials such as poly(fluoroalkyl)methacrylate and copolymers thereof. One such example is that of Ohmori et al. (U.S. Pat. No. 4,500,694) which is a copolymer consisting essentially of a fluorine-containing methacrylate monomer unit and a fluorine-containing acrylate monomer unit. This copolymer has marked improved thermal resistance, high transparency, low refractive index and high flexibility. These copolymers have molecular weights ranging from about 200,000 to about 4,000,000 and are typically used in injection molding processes. Although these copolymers may be used for coating compositions, the ability to apply them uniformly on a nanoscale level (ranging from 0.1 nanometers to about 200 nanometers) is unlikely.

Thünemann and Lochhaas reported a fluorinated complex that can be used as a coating material for smooth surfaces which does not affect the appearance of the surface (Andreas F. Thünemann and Kai Helmut Lochhaas, *Surface and Solid-State Properties of a Fluorinated Polyelectrolyte-Surfactant Complex*, 15 Langmuir, Apr. 7, 1999, at 4867.). This coating material is a highly ordered mesomorphous polyelectroltye-surfactant complex capable of repelling oil and water. The complex, itself, is insoluble in water. However, when the complex comes into contract with water, it displays a dramatic surface reconstruction, which is reversible when redried. This reconstruction results in an increase in surface energy, causing the surface to repel oil and water. Although these films demonstrated the desired ability to repel oil and water, the teaching in this article suggests that they must be applied at thicknesses between about 0.1 mm to about 1.0 mm, which is too thick for optical and other thin-film applications. Lin et al. found that cross-linking immobilizes the oriented perfluoroalkyl groups when forming a nonstick surface (Jun Lin, Jiayi Zhu, Douglas R. Swanson and Larry Milco, *Cross-Linking and Physical Characteristics of a Water-Based Nonstick Hydrophobic Coating*, 12 Langmuir, Dec. 1, 1996, at 6676.). Thus, cross-linking actually impedes water-induced structural rearrangement in the coating. However, these films are about 1.5 microns to about 2.1 microns thick, making them unsuitable for optical or thin-film applications. In each of these instances, the polymer is already formed prior to surface application.

Schmidt et al. prepared a class of water-based non-stick coatings using self-assembly and immobilization of reactive polymeric surfactants containing pendant perfluoroalkyl groups which become oriented to yield surfaces with very low energy (Donald L. Schmidt, Charles E. Coburn, Benjamin M. DeKoven, Gregg E. Potter, Gregory F. Meyers, and Daniel A. Fischer, *Water-Based Non-Stick Hydrophobic Coatings*, 368 Nature, Mar. 3, 1994, at 39.). Various reactive perfluoroalkyl polymeric surfactants were prepared by copolymerizing acrylate or methacrylate esters of fluoroalkyl alcohols with carboxylic acid functional vinyl monomers. The formulation, comprising a 10:10:80 weight ratio of solids, ethylene glycol, and water were cast and cured on microscope slides. The final films were cross-linked to prevent attack by polar solvents. Schmidt et al. disclose various examples of the surfactants in U.S. Pat. No. 5,006,624. The resulting films are much thicker than the thickness suitable for the present invention where uniform application of the coating within the nanoscale range (0.1 nanometers to about 200 nanometers) is desirable.

Miller (U.S. Pat. No. 6,270,946) discloses a process for producing nanoscale features on a substrate. The process involves the selective application of a first difunctional molecule to the surface of a substrate and allowing it to react with the substrate. A second difunctional molecule is applied and reacted with the unreacted functional groups from the first difunctional molecule to form a patterned layer on the surface of the substrate. The selective application was accomplished by using a nanoscale delivery device. This process results in the formation of nanoscale features in three directions (x, y and z) at selective locations on the substrate. The problem with this method is that gaps are left on the surface of the substrate, causing the substrate to remain unprotected. In addition, this process is not amenable to mass production because of the selectivity required in applying the first difunctional molecule.

An object of the present invention is to prepare a coated substrate using self-assembled techniques such that each bilayer has a thickness ranging from about 0.1 nanometers to about 20 nanometers.

Another object of the present invention is to prepare a uniformly coated substrate that is hydrophobic and/or oleophobic.

Another object of the present invention is to prepare a uniformly coated substrate wherein the coating has very low absorption (wavelengths ranging from about 300 nm to about 3000 nanometers).

SUMMARY OF THE INVENTION

By the present invention, a coated substrate is claimed. The coating, disposed on the substrate, comprises a self-assembled film having at least one bilayer. Each bilayer comprises a polyanion electrolyte layer and a polycation electrolyte layer. The uppermost layer or exposed layer of the coating comprises a fluoroalkyl group. Each bilayer thickness ranges from about 0.1 nanometers to about 20 nanometers. The resulting coated substrate has a low surface energy and is hydrophobic and/or oleophobic. The materials involved in preparing the coating are not difunctional in nature but are multifunctional. The multifunctionality allows the polymer to react with the surface of the substrate and provides for easy application of the polymer to the substrate. The ability to form the coating through self-assembly allows the fabricator to control the thickness of the coating on a nanoscale level. For optical applications, this is desirable because the coating should have a nominal effect on the optical properties of the substrate.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

DETAILED DESCRIPTION OF THE PREFERRED EMBODIMENTS

Figure 1:
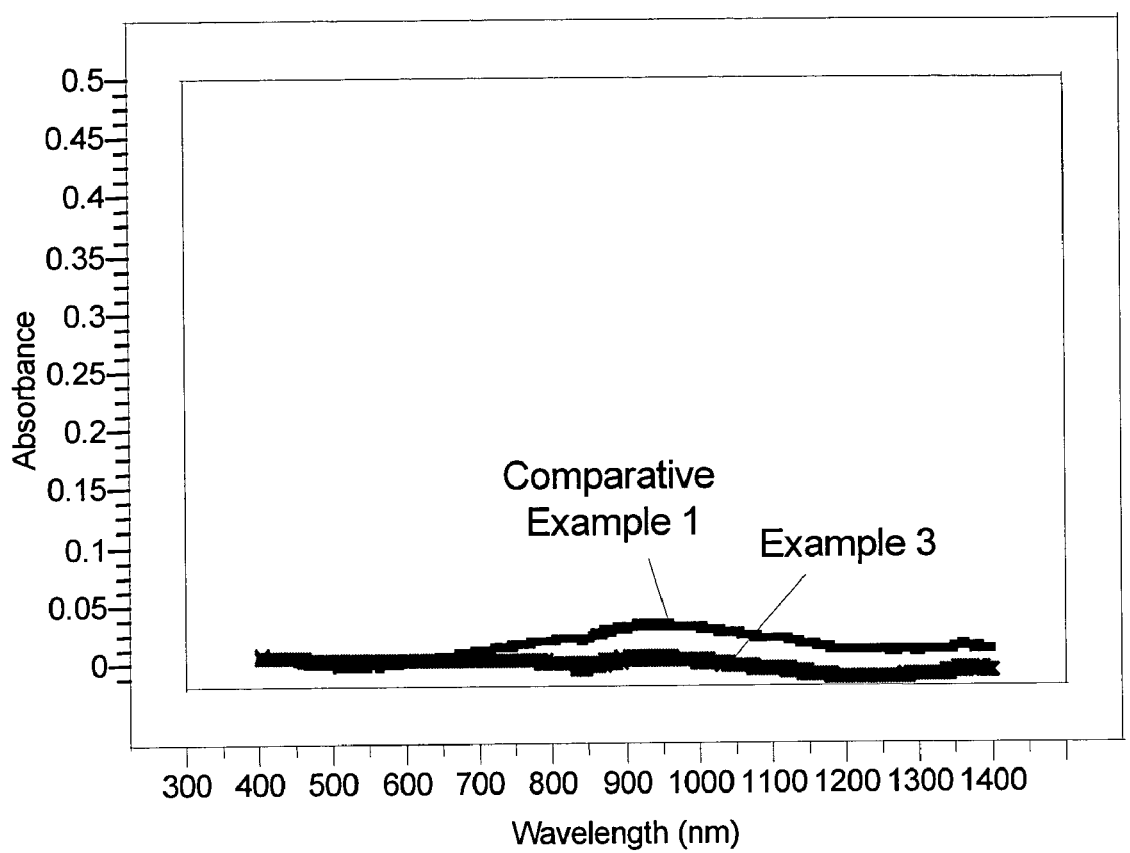
FIG. 1 is a comparison of the absorption curves of Comparative Example 1 and Example 3.

A coated substrate is presented such that the coated substrate is an assembly of a substrate and a coating disposed on the substrate. The coating comprises a self-assembled film having at least one bilayer. Each bilayer comprises a polyanion electrolyte layer and a polycation electrolyte layer. The polyelectrolytes of the present invention contain functional groups along the backbone of the molecule such that they are multifunctional and not difunctional. Hence, growth of coating layers occurs only in two directions (along the x- and y-axis) to form a two-dimensional coating. An uppermost layer is a compound comprising a fluoroalkyl group. Each bilayer has a thickness ranging from about 0.1 nanonmeters to about 20 nanometers.

The coated substrates are prepared by providing a substrate. A first electrolyte layer is applied to the substrate. Any method of application may be used such as dipping or spray coating, provided that a uniform coating is applied to the substrate such that no portion of the surface of the substrate remains exposed. Next, a second electrolyte layer is applied to the first electrolyte layer and the second electrolyte layer is allowed to react with the first electrolyte layer to form a bilayer. A compound comprising a fluoroalkyl group is applied to the bilayer to form a coating on the substrate. To build-up the thickness of the coating, the first and second electrolyte layers are alternately added one on top of the other a plurality of times until the desired thickness is achieved. Preferably, this thickness ranges from about 0.1 nanometers to about 200 nanometers. The coating layers of the present invention differ from those of Miller because the resulting coating is that of a two dimensional structure (along the x- and y-axis only). There is no structural detail in a third direction (or along the z-axis).

Any substrate known to those of skill in the art may be employed in forming the coated substrate of the present invention. Such substrates may be inorganic or organic in nature. Examples of inorganic substrates include but are not limited to: silica glass, quartz glass, sapphire, ruby, spinel ceramic glass, yttrium silver, optical high-lead glass, cubic zirconia, a reflecting material, and a high index optical quality glass. Preferably the substrate comprises silica glass.

As with the inorganic substrates, any organic substrates known to those of skill in the art may be employed by the present invention. Organic substrates include but are not limited to: polyester, polycarbonate, polyacrylate, poly(m-ethyl methacrylate), polyamide, and polystyrene. Preferable organic susbstrates include but are not limited to: polycarbonate, polyester, and polyacrylate substrates. The substrates may have a variety of functions. However, the preferred substrates of the present invention are those which are used for optical applications. Such optical substrates may be either transparent or reflecting. Preferably, the optical substrate is transparent. In addition, the substrates may come in a variety of shapes. Representative shapes include but are not limited to: curved, flat, cylindrical, conical and spherical shapes. Preferably the substrates have either a flat or curved shape. Curved shaped substrates are typically used as lenses for optical applications.

The polyanion electrolytes used for preparing the coatings of the present invention may be any polyanion electrolyte known to those of skill in the art. The polyanion may or may not be fluorinated. Preferably, the polyanion is poly(acrylic acid) polyelectrolyte. More specifically, the poly(acrylic acid) polyelectrolytes of the present invention have the following general structure:

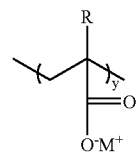

where: y=1 to 200,000;
M is selected from the group consisting of: H, Li, Na and K; and
R is selected from the group consisting of: hydrogen, methyl or ethyl.

Alternatively, the poly(acrylic acid) polyelectrolyte may be a fluorocarbon-modified poly(acrylic acid) which has the following structure:

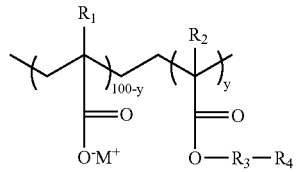

where:
y=0.1 to 90 mole percent;
M is selected from the group consisting of: H, Li, Na, and K;
$R_1$ is selected from the group consisting of: H, $CH_3$, and $CH_3CH_2$—;
$R_2$ is selected from the group consisting of: H, $CH_3$, and $CH_3CH_2$—;
$R_3$ is selected from the group consisting of: (—$CH_2CH_2O$)$_x$ where x=1 to 20;
$R_4$ is selected from the group consisting of: (—$CF_2$)$_n$ $CF_3$ where n=1 to 50.

The polycation electrolyte may be any polycation electrolyte known to those of skill in the art. In particular, the polycation electrolyte comprises a poly(allylamine hydrocholoride) polycation having the structure:

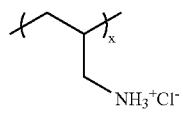

where x=1 to 200,000.

Alternatively, the polycation may be a fluorinated polycation.

The uppermost layer of the coating comprises a compound having a fluoroalkyl group. Any compound containing a fluoroalkyl group may be suitable. Preferably, the fluoroalkyl group has the structure:

where x=0 to 50.

The formation of the bilayers of the self assembly may be such that either the polyanion electrolyte layer is disposed on the substrate first or the polycation electrolyte layer. Choice of the electrolyte layer will depend on the charge of the substrate initially. For example, if the charged substrate is initially positive, then the polyanion electrolyte layer will be deposited first. Alternatively, if the charged substrate is negative, the polycation electrolyte layer will be applied first. In addition, the electrolyte layers may be of varying combinations. For example, a polyanion electrolyte layer may be used in combination with a polycation electrolyte layer that is fluorinated and vice-versa or both electrolyte layers may be fluorinated or neither electrolyte layer may be fluorinated. This is a matter of choice depending on the desired properties of the final coating.

The self-assembly method involves the electrostatic attraction of interlayer charges. This causes the film layer to be self-limiting in thickness and uniform at the molecular level. Each bilayer has a thickness ranging from about 0.1 nanometers to about 20 nanometers. Therefore, when the coating is fabricated with a single bilayer, it may have a thickness of about 0.1 nanometers. Alternatively, if a plurality of bilayers comprise the coating, the thickness may be about 200 nanometers. For optical applications, the coating has a thickness of about 1 nanometer to about 10 nanometers. Also, preferably, the coating absorbs less than 1% of transmitted light between wavelengths of about 300 nanometers and about 3000 nanometers.

The electrolytes may be applied to the substrate by any method known to those of skill in the art such as, dipping, spin casting, and spraying. For optical applications, dipping is preferred as the other two methods have an adverse affect on lenses. Each layer is permitted to dry at room temperature prior to application of the next layer. Further, the coating may undergo a post-cure to initiate crosslinking. The coating may be heated or exposed to air to initiate crosslinking. The crosslinking process can convert ionic bonds between the polyanion and the polycation into covalent bonds. This simplistic method of dipping and drying at room temperature facilitates manufacturing, minimizes costs, and is environmentally friendly.

EXAMPLES

In the following examples, contact angles were determined using a FTA100 Contact Angle Analyzer. A drop of either water or hexadecane was placed on the surface and the angle of the drop edge contacting the surface was measured. The higher the contact angle the less the surface was wetted. A higher contact angle indicates that the surface is more resistant to contamination. Hexadecane was used to simulate wetting of oils and other hydrocarbons.

Example 1

A glass microscope slide was cleaned according to the following procedure. The glass slide was immersed in a base solution (mixture of 370.4 g deionized water, 41.2 g of 50% $H_2O_2$ and 68.8 g of ammonium hydroxide). The solution containing the slide was heated to 70° C. and held for 20 minutes. The slide was removed from the solution and rinsed with deionized water. The glass slide was then immersed in an acid solution (384 g of deionized water, 36 g of 50% H2O2 and 60 g of 12M HCl) for 20 minutes at room temperature. The slide was removed from the acid solution, rinsed with deionized water and dried for 60 minutes at 130° C.

The water contact angle of the cleaned glass slide was measured at 32° and the hexadecane contact angle was measured at 5°.

Example 2

Microscope glass slides were cleaned by first soaking in a base solution (370.4 g of deionized water, 41.2 grams of 50% hydrogen peroxide and 68.8 g of ammonium hydroxide) for 20 minutes at 70° C. The slides were then rinsed with deionized water. The slides were then treated with an acid solution (384.0 g of deionized water, 36.0 grams of 50% hydrogen peroxide and 60.0 g of 12 M HCl) for 20 minutes at room temperature. The slides were rinsed with deionized water and then dried in a convection oven for 60 minutes at 130° C.

A solution of poly(allylamine hydrochloride), PAH, was made by stirring 0.66g PAH in 600 mL DI water and adjusting the pH to 4.5. A solution of poly(acrylic acid), PAA, was made by stirring 0.78 mL PAA in 600 mL DI water and adjusting the pH to 4.5. The Zonyl FSA solution was made by mixing 2 g Zonyl FSA with 100 mL DI water and adjusting the pH to 9.0. The glass slide was cleaned as described in Comparative Example 1. The glass slide was first dipped in the PAH solution, rinsed with deionized water and then dipped in the PAA solution. This process was repeated until 10 PAH/PAA bilayers were obtained. The slides were then dipped into PAH rinsed with deionized water and then dipped into the Zonyl FSA solution to apply the top layer. The film was heated in an oven at 200–210° C. for ~20 minutes.

The water contact angle of the coated slide was measured at 84° and the hexadecane contact angle was measured at 21°.

Example 3

The poly(fluoromethacrylate-co-acrylic acid) (PFAA) random copolymer was prepared using the following procedure. Acrylic acid (9.1 grams, 12.6 mmol) and Zonyl® TM fluoromonomer (11.2 grams, 2.1 mmol, obtained from Aldrich) were combined with 50 grams of dioxane in a 250 ml round bottom flask and blanketed with nitrogen. Azobisisobutyronitrile (0.039 grams, 0.24 mmol), AIBN, was then added. The solution was purged with nitrogen for one hour at 0° C. and then heated to 60° C. for 24 hours under nitrogen. The polymer was isolated by pouring the solution into 500 ml of diethyl ether and then filtered.

A coating was made from alternating layers of PAH and PFAA. To make the coatings, a solution of PAH (10 mM in water) and a solution of a fluorinated acrylic acid, PFAA (0.7 grams in 600 ml 51/49 (by weight) mixture of isopropanol and water) were first prepared. The glass slide (cleaned in the same manner described in Example 2) was first dipped in the PAH solution, rinsed with deionized water and then dipped in the PFAA solution and rinsed again with deionized water. This process was repeated until the 10 PAH/PFAA bilayers were applied to the slide. After the coating was deposited, the films were heated in a vacuum oven for 20 minutes at 210° C.

The water contact angle of the coated slide was measured at 99° and the hexadecane contact angle was measure at 52°.

The light absorption of Comparative Example 1 and Example 3 was determined from 400 to 1400 nm. First, transmission and reflection was measured for each slide using a Shimadzu UV-3101PC UV-Vis-NIR Scanning Spectrophotometer. The absorption was then calculated as follows.

Absorbance=1−(Transmission+Reflectance)

FIG. 1 compares the absorption curves of Comparative Example 1 and Example 3. Between 400 and 1400 nm the absorption of the coated slide (Example 3) is not significantly different from the uncoated glass slide (Comparative Example 1). The coating of the present invention drastically changes the surface properties as evidence by the increase in contact angle without significantly changing the light absorption or transmission characteristics.

Example 4

A coating was made from alternating layers of PAH and PAA with a top layer of PAH and PFAA. To make the films, a solution of PAH (10 mM in water) and a solution of a fluorinated acrylic acid, PAA (0.78 mL PAA in 600 mL DI water), (PFAA (0.7 grams in 600 ml 51/49 (by weight) mixture of isopropanol and water) were prepared. The glass slide (cleaned in the same manner described in Example 2) was first dipped in the PAH solution, rinsed with deionized water and then dipped in the PAA solution and rinsed again with deionized water. This process was repeated until the 10 PAH/PAA bilayers were applied to the slide. The slide was then dipped in the PAH solution, rinsed with deionized water and then dipped in the PFAA solution and rinsed again with deionized water. This process was repeated until two PAH/PFAA bilayers were applied. After the coating was deposited, the glass slide was heated in a vacuum oven for 20 minutes at 210° C.

The water contact angle of the coated slide was measured at 99° and the hexadecane contact angle was measured at 46°.

Comparative Example 5

A quartz slide was cleaned according to the following procedure. The quartz slide was immersed in a base solution (mixture of 370.4 g deionized water, 41.2 g of 50% $H_2O_2$ and 68.8 g of ammonium hydroxide). The solution containing the slides was heated to 70° C. and held for 20 minutes. The quartz slide was removed from the solution and rinsed with deionized water. The quartz slide was then immersed in an acid solution (384 g of deionized water, 36 g of 50% H2O2 and 60 g of 12M HCl) for 20 minutes at room temperature. The slide was removed from the acid solution, rinsed with deionized water and dried for 60 minutes at 130° C.

The water contact angle of the coated slide was measured at 36° and the hexadecane contact angle was measure at 11°.

Example 6

A solution of poly(allylamine hydrochloride), PAH, was made by stirring 0.66 g PAH in 600 mL DI water and adjusting the pH to 4.5. A solution of poly(acrylic acid), PAA, was made by stirring 0.78 mL PAA in 600 mL DI water and adjusting the pH to 4.5. The Zonyl FSA solution was made by mixing 2 g Zonyl FSA with 100 mL DI water and adjusting the pH to 9.0. A quartz slide was cleaned as described in Comparative Example 5. The quartz slide was first dipped in the PAH solution, rinsed with deionized water and then dipped in the PAA solution. This process was repeated until 10 PAH/PAA bilayers were obtained. The quartz slide was then dipped into PAH rinsed with deionized water and then dipped into the Zonyl FSA solution to apply the top layer. The quartz slide was heated in an oven at 200–210° C. for 20 minutes.

The water contact angle of the coated slide was measured at 94° and the hexadecane contact angle was measured at 46°.

Comparative Example 7

A fused silica optical lens was cleaned according to the following procedure. The fused silica lens was immersed in an acid solution (192 g of deionized water, 18 g of 50% H2O2 and 30 g of 12M HCl) for 20 minutes at room temperature. The fused silica lens was removed from the acid solution, rinsed with deionized water and dried for 60 minutes at 130° C.

The water contact angle (an average of five measurements) of the coated fused silica lens was determined to be 730 and the hexadecane contact angle (an average of five measurements) was measured at 5°.

Example 8

A coating made from alternating layers of PAH and PFAA was applied to the fused silica optical lens. The preparation of PFAA is described in Example 3. To make the films, a solution of PAH (10 mM in water) and a solution of a fluorinated acrylic acid, PFAA (0.7 grams in 600 ml 51/49 (by weight) mixture of isopropanol and water) were prepared. The fused silica lens (cleaned in the manner described in Comparative Example 7) was first dipped in the PAH solution, rinsed with deionized water and then dipped in the PFAA solution and rinsed again with deionized water. This process was repeated until the 10 PAH/PFAA bilayers were applied to the fused silica lens. After the coating was deposited, the fused silica lens was heated in a vacuum oven for 20 minutes at 210° C.

The water contact angle (an average of five measurements) of the coated fused silica lens was determined to be 108° and the hexadecane contact angle (an average of five measurements) was measured at 46°. The coating greatly increased the water and hexadecane contact angle indicating an increase in water and oil resistance.

Comparative Example 9

A polyester film (Melinex Film 0.01, type 561) was cleaned according to the following procedure. The polyester film was immersed in ethanol and sonicated for 10 minutes. The film with rinsed with deionized water. The polyester film was then immersed in deionized water and sonicated for 10 minutes. The polyester film was again rinsed with deionized water. The polyester film was then immersed in an 8% sulfuric acid aqueous solution for 15 minutes. The polyester film was removed and rinsed with deionized water. The film was blown dry with nitrogen and then heated at 200° C. for 10 minutes.

The water contact angle (an average of three measurements) of the cleaned polyester film was determined to be 63°.

Example 10

A coating made from alternating layers of PAH and PFAA was applied to the polyester films described in Comparative Example 9. The preparation of PFAA is described in Example 3. To make the films, a solution of PAH (1. 1 g in 1000 g deionized water) and a solution of PFAA (1.4 grams in 1400 ml 50/50 (by volume) mixture of isopropanol and water) were prepared. The polyester film (cleaned in the manner described in Comparative Example 9) was first dipped in the PAH solution and held for three minutes, rinsed with deionized water. The polyester films were then dipped in the PFAA solution, held for three minutes and rinsed again with deionized water. This process was repeated until 10 PAH/PFAA bilayers were applied to the polyester film. After the coating was deposited, the films were heated in an oven for 10 minutes at 200° C.

The water contact angle (an average of three measurements) of the coated slide was determined to be 104°. The coating greatly increased the water contact angle thus increases resistance to contamination.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A coated substrate comprising:
    a substrate;
    a coating disposed on the substrate, wherein the coating comprises a self-assembled film having at least one bilayer, wherein each bilayer comprises a polyanion electrolyte layer and a polycation electrolyte layer, wherein an uppermost layer is a compound comprising a fluoroalkyl group; and
    wherein each bilayer thickness ranges from about 0.1 nanometers to about 20 nanometers and wherein the coating absorbs less than 1% of transmitted light between wavelengths of about 300 nanometers to about 3000 nanometers.

2. A coated substrate according to claim 1, wherein the substrate is an inorganic substrate selected from the group consisting of: silica glass, quartz glass, sapphire, ruby, spinel ceramic glass, yttrium silver, optical high-lead glass, cubic zirconia, a reflecting material, and a high index optical quality glass.

3. A coated susbstrate according to claim 1, wherein the substrate is silica glass.

4. A coated substrate according to claim 1, wherein the substrate is an organic substrate selected from the group consisting of: polyester, polycarbonate, polyacrylate, poly (methyl methacrylate), polyamide, and polystyrene.

5. A coated substrate according to claim 4, wherein the substrate is polycarbonate.

6. A coated substrate according to claim 4, wherein the substrate is polyester.

7. A coated substrate according to claim 4, wherein the substrate is polyacrylate.

8. A coated substrate according to claim 1, wherein the substrate is an optical substrate.

9. A coated substrate according to claim 8, wherein the optical substrate is either transparent or reflecting.

10. A coated substrate according to claim 9, wherein the optical substrate is transparent.

11. A coated substrate according to claim 1, wherein the substrate has a shape selected from the group consisting of: curved, flat cylindrical, conical, and spherical.

12. A coated substrate according to claim 11, wherein the substrate has a curved shape.

13. A coated substrate according to claim 11, wherein the substrate has a flat shape.

14. A coated substrate according to claim 1, wherein the polyanion electrolyte comprises a poly(acrylic acid) polyelectrolyte.

15. A coated substrate according to claim 14, wherein the poly(acrylic acid) polyelectrolyte has the structure:

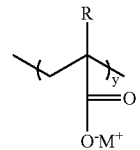

where: y=1 to 200,000;
    M is selected from the group consisting of: H, Li, Na and K; and
    R is selected from the group consisting of: hydrogen, methyl or ethyl.

16. A coated substrate according to claim 14, wherein the poly(acrylic acid) polyelectrolyte is a fluorocarbon-modified poly(acrylic acid) having the structure:

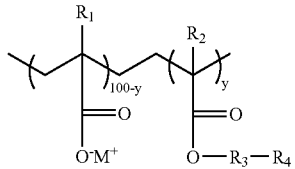

where:
    y=0.1 to 90 mole percent;
    M is selected from the group consisting of: H, Li, Na, and K;
    $R_1$ is selected from the group consisting of: H, $CH_3$, and $CH_3CH_2$—;

$R_2$ is selected from the group consisting of: H, $CH_3$, and $CH_3CH_2$—;

$R_3$ is selected from the group consisting of: —$(CH_2CH_2$—$O)_x$ where x=1 to 20;

$R_4$ is selected from the group consisting of: —$(CF_2)_n CF_3$ where n=1 to 50.

17. A coated substrate according to claim 1, wherein the polycation electrolyte comprises a poly(allylamine hydrochloride) polycation.

18. A coated substrate according to claim 17, wherein the poly(allylamine hydrochloride) polycation has the structure:

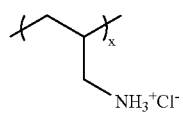

where x=1 to 200,000.

19. A coated substrate according to claim 1, wherein the fluoroalkyl group has the structure:

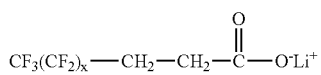

where x=0 to 50.

20. A coated substrate according to claim 1, wherein the polycation is a fluorinated polycation.

21. A coated substrate according to claim 1, wherein the polyanion is a fluorinated polyanion.

22. A coated substrate according to claim 1, wherein the coating comprises a plurality of bilayers and the coating has a thickness of about 0.1 nanometers to about 200 nanometers.

23. A coated substrate according to claim 22, wherein the coating has a thickness of about 1 nanometer to about 10 nanometers.

24. A coated substrate prepared by:
a) providing a substrate;
b) applying a first electrolyte layer to the substrate;
c) applying a second electrolyte later to the first electrolyte layer and allowing the second electrolyte layer to react with the first electrolyte layer to form a bilayer;
d) applying a compound comprising a fluoroalkyl group to the bilayer to form a coating on the substrate, wherein the coating absorbs less than 1% of transmitted light between lengths of about 300 nanometers to about 3000 nanometers.

25. A coated substrate according to claim 24, wherein the steps of applying a second electrolyte layer to the first electrolyte layer are repeated a plurality of times to form a coating having a thickness ranging from about 0.1 nanometers to about 200 nanometers.

26. A coated substrate according to claim 24, wherein the first electrolyte layer is a polyanion electrolyte layer and wherein the second electrolyte layer is a polycation electrolyte layer.

27. A coated substrate according to claim 24, wherein the first electrolyte layer is a polycation electrolyte layer and the second electrolyte layer is a polyanion electrolyte layer.

28. A coated substrate according to claim 26, wherein the polyanion electrolyte layer comprises a poly(acrylic acid) polyelectrolyte.

29. A coated substrate according to claim 28, wherein the poly(acrylic acid) polyelectrolyte has the structure:

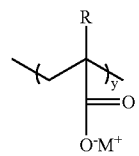

where: y=1 to 200,000;

M is selected from the group consisting of: H, Li, Na and K; and

R is selected from the group consisting of: H, $CH_3$-, and $CH_3CH_2$-.

30. A coated substrate according to claim 28, wherein the poly(acrylic acid) polyelectrolyte is a fluorocarbon-modified poly(acrylic acid) having the structure:

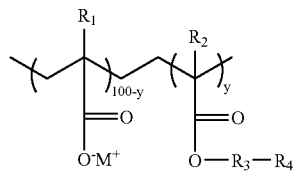

where:
y=0.1 to 90 mole percent;
M is selected from the group consisting of: H, Li, Na, and K;
$R_1$ is selected from the group consisting of: H, $CH_3$, and $CH_3CH_2$—;
$R_2$ is selected from the group consisting of: H, $CH_3$, and $CH_3CH_2$—;
$R_3$ is selected from the group consisting of: —$(CH_2CH_2$—$O)_x$ where x=1 to 20;
$R_4$ is selected from the group consisting of: —$(CF_2)_n CF_3$ where n=1 to 50.

31. A coated substrate according to claim 26, wherein the poly(allylamine hydrochloride) polycation has the structure:

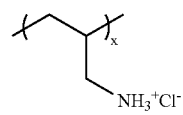

where x=1 to 200,000.

32. A coated substrate according to claim 27, wherein the poly(allylamine hydrochloride) polycation has the structure:

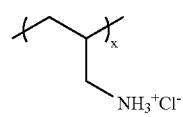

where x=1 to 200,000.

33. A coated substrate according to claim 27, wherein the polyanion electrolyte layer comprises a poly(acrylic acid) polyelectrolyte.

34. A coated substrate according to claim 33, wherein the poly(acrylic acid) polyelectrolyte has the structure:

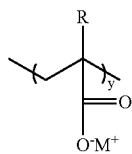

where: y=1 to 200,000;
M is selected from the group consisting of: H, Li, Na and K; and
R is selected from the group consisting of: H, CH$_3$-, and CH$_3$CH$_2$-.

35. A coated substrate according to claim 33, wherein the poly(acrylic acid) polyelectrolyte is a fluorocarbon-modified poly(acrylic acid) having the structure:

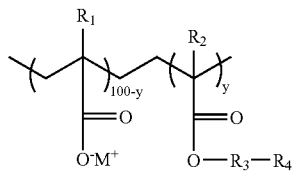

where:
y=0.1 to 90 mole percent;
M is selected from the group consisting of: H, Li, Na, and K;
R$_1$ is selected from the group consisting of: H, CH$_3$, and CH$_3$CH$_2$—;
R$_2$ is selected from the group consisting of: H, CH$_3$, and CH$_3$CH$_2$—;
R$_3$ is selected from the group consisting of: —(CH$_2$CH$_2$—O)$_x$ where x=1 to 20;
R$_4$ is selected from the group consisting of: —(CF$_2$)$_n$CF$_3$ where n=1 to 50.

36. A coated substrate according to claim 24, wherein the fluoroalkyl group has the structure:

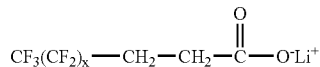

where x=0 to 50.

37. A coated substrate according to claim 26, wherein the polyanion electrolyte layer comprises a fluorinated polyanion.

38. A coated substrate according to claim 26, wherein the polycation electrolyte layer comprises a fluorinated polycation.

39. A coated substrate according to claim 38, wherein the polyanion electrolyte layer comprises a fluorinated polyanion.

40. A coated substrate according to claim 24, wherein the polyanion electrolyte layer comprises a fluorinated polyanion.

41. A coated substrate according to claim 24, wherein the polycation electrolyte layer comprises a fluorinated polycation.

42. A coated substrate according to claim 41, wherein the polyanion electrolyte layer comprises a fluorinated polyanion.

* * * * *